United States Patent
Nakanuma

(10) Patent No.: US 11,882,114 B2
(45) Date of Patent: Jan. 23, 2024

(54) AUTHENTICATION METHOD AND AUTHENTICATION SYSTEM IN IP COMMUNICATION

(71) Applicant: Koga Electronics Co., Ltd., Koka (JP)

(72) Inventor: Tadashi Nakanuma, Koka (JP)

(73) Assignee: KOGA ELECTRONICS CO., LTD., Koka (JP)

( * ) Notice: Subject to any disclaimer, the term of this patent is extended or adjusted under 35 U.S.C. 154(b) by 261 days.

(21) Appl. No.: 17/424,629

(22) PCT Filed: May 14, 2020

(86) PCT No.: PCT/JP2020/019253
§ 371 (c)(1),
(2) Date: Jul. 21, 2021

(87) PCT Pub. No.: WO2021/229749
PCT Pub. Date: Nov. 18, 2021

(65) Prior Publication Data
US 2022/0321552 A1    Oct. 6, 2022

(51) Int. Cl.
*H04L 29/06*  (2006.01)
*H04L 9/40*  (2022.01)
*G06F 21/44*  (2013.01)

(52) U.S. Cl.
CPC .......... *H04L 63/083* (2013.01); *G06F 21/445* (2013.01)

(58) Field of Classification Search
CPC .... H04L 63/083; H04L 63/1483; G06F 21/44
(Continued)

(56) References Cited

U.S. PATENT DOCUMENTS

| 8,533,458 B2 * | 9/2013 | Jeong | H04L 9/3273 |
| | | | 713/169 |
| 2007/0253553 A1 * | 11/2007 | Abdul Rahman | G07F 7/1008 |
| | | | 380/259 |

(Continued)

FOREIGN PATENT DOCUMENTS

| JP | 11-243394 A | 9/1999 |
| JP | 2015-128230 A | 7/2015 |
| JP | 2015-170220 A | 9/2015 |

OTHER PUBLICATIONS

Enhancing security in specialized use of mobile IP, Ahmed et al., Feb. 2016 (Year: 2016).*

(Continued)

*Primary Examiner* — Jahangir Kabir
(74) *Attorney, Agent, or Firm* — WHDA, LLP

(57) ABSTRACT

In IP communication, an authentication code AC1 uniquely generated by a receiving-side communication device 1b is sent to an originating-side communication device 1a (S1, S2), and stored in the originating-side communication device (S3). Packets in which the stored authentication code is embedded are sent to the receiving-side communication device 1b on connection from the originating-side communication device 1a to the receiving-side communication device 1b (S4), and it is determined at the receiving-side communication device whether the originating-side communication device is true or false depending on if the authentication code sent from the receiving-side communication device is contained in the packets received from the originating-side communication device or not (S5).

2 Claims, 3 Drawing Sheets

(58) Field of Classification Search
USPC .......................................................... 726/2
See application file for complete search history.

(56) References Cited

U.S. PATENT DOCUMENTS

| | | | |
|---|---|---|---|
| 2010/0042834 A1* | 2/2010 | Moret .................. | H04L 63/0823 |
| | | | 713/168 |
| 2015/0012968 A1* | 1/2015 | Sugahara ............ | G06F 12/1408 |
| | | | 726/2 |
| 2019/0238336 A1* | 8/2019 | Woo .......................... | H04L 9/32 |

OTHER PUBLICATIONS

"Interface", CQ Publishing Co., Ltd., Jun. 1, 1992, vol. 18, No. 6, pp. 124-148, [ISSN]0387-9569, cited in ISR, w/English machine translation regarding relevant passages of p. 130 (33 pages).

* cited by examiner

AUTHENTICATION METHOD AND AUTHENTICATION SYSTEM IN IP COMMUNICATION

TECHNICAL FIELD

The present invention relates to an authentication method and an authentication system in IP communication.

BACKGROUND ART

In recent years, IP networks have become widespread all over the world, and IoT (Internet of Things) systems such as an automatic meter reading system for a gas meter or a water meter, a smart grid, a HEMS (Home Energy Management System), a remote monitoring system, a sensor network and so on, which connect machines to each other via a communication network and performs autonomous monitoring and control, etc., are about to be put to practical use.

Here, a term "IP network" means a packet communication network such as the Internet or an intranet (WAN (Wide Area Network) and LAN (Local Area Network), etc.) which adopts an IP (Internet Protocol) (the same hereinafter).

In M2M (Machine-to-Machine) communication systems which perform communication of these IoT systems, normally, a central communication device (one machine) and one or more communication terminals (the other machine) are connected to the IP network through communication lines to each of which unique identification number (an IP address, a port number and so on) is assigned.

Then the communication line of the central communication device and the communication lines of the one or more communication terminals are uniquely connected to each other based on the identification numbers, and data communication is performed between the central communication device and the one or more communication terminals.

By the way, the data communication in the IP network is normally performed through relay devices of a plurality of communications companies, so that the data communication in the IP network has a problem impersonation of IP address of an originating-side communication line, that is, a problem of spoofing.

The spoofing is performed by sending packets from a fake originating-side communication line with not an own identification number but an identification number of a true originating-side communication line as an source identification number.

In this case, although the source identification number is included in the packets together with a destination identification number, the originating-side communication line is uniquely connected to an receiving-side communication line designated by the destination identification number regardless of whether the originating-side communication line is the true communication line or the fake communication line.

That is to say, the source and destination identification numbers are included in the packets, and the originating-side communication line is uniquely connected to the receiving-side communication line designated by the destination identification number regardless of the authenticity of the originating-side communication line.

Thus it is disguised as if a true communication device having the original identification number or a communication line accommodating such communication line were connected to the lower level of the fake communication line or a relay device to which such fake communication line belongs.

In this case, at the receiving-side communication line, it is not possible to determine the authenticity of the source identification number indicated by the received packet signals, and communication is started based on the information contained in the packet signals.

In this way, the impersonation is performed.

The spoofing of communication line can be easily performed by means of known methods such as, for example, source rooting, TCP sequence number prediction and so on, or by means of modification of function of a router, etc.

In order to avoid damage caused by spoofing and protect data transmitted between communication devices, a method of exchanging a pass word (one-time password) through a device that issues a password at any time or for each communication, and a method of encrypting communication have been proposed in the prior art.

However, according to those conventional methods, it is necessary to provide a complicated and high-cost system for generation for issuing the password or encrypting communication, and also if the password and encryption key would be leaked or decoded, there is a risk that secure data transmission will not be guaranteed.

Further, according to those conventional methods, there is a risk that secure data transmission will not be guaranteed for the reason that spoofing has already occurred in the data communication by the first connection, and that it is not possible to determine whether spoofing occurs or not, and that no spoofing is expected, and so on.

PRIOR ART DOCUMENTS

Patent Documents

Patent Document 1: JP 2015-170220 A
Patent Document 2: JP 2015-128230 A

SUMMARY OF THE INVENTION

Problems to be Solved by the Invention

It is, therefore, an object of the present invention to achieve secure communication between communication devices in an IP network by excluding spoofing of communication line.

Means for Solving the Problem

In order to solve the object, the present invention provides a method for authenticating an originating-side communication device of a group at a receiving-side communication device of the same group in IP communication, the IP communication being performed in a manner such that a plurality of communication devices of the same group are connected to an IP network through communication lines with unique identification numbers and that each of the plurality of communication devices records the identification numbers of the other communication devices in advance and that the originating-side communication device is uniquely connected to the receiving-side communication device based on the identification number so as to transmit packets between the originating-side and receiving-side communication devices, comprising: (1) generating a new authentication code at the receiving-side communication device whenever at least one prescribed condition is met; (2) sending the new authentication code from the receiving-side communication device to the originating-side communication device through packets of new communication which is not affected by past communication information at each generation of the new authentication code; (3) overwriting the authentication code on a storage of the originating-side communication device whenever the authentication code is received from the receiving-side communication device; (4) sending packets containing the overwritten authentication code from the originating-side communication device to the receiving-side communication device on connection from the originating-side communication device to the receiving-side communication device; and (5) determining at the receiving-side communication device that the originating-side communication device is true when the latest authentication code sent from the receiving-side communication device is contained in the packets received by the receiving-side communication device, while determining at the receiving-side communication device that the originating-side communication device is false when such latest authentication code is not contained.

Here, "communication device" means a single computer with a function to connect to an IP network, or a router located between a communication line and a LAN (private network) to which a plurality of computers are connected, and "computer" contains a large server, a PC (Personal Computer), an IoT terminal and so on (the same hereinafter).

Also, "when at least one prescribed condition is met" means "at a time when the power of the receiving-side communication device is turned on" or "at a time when the receiving-side communication device is initialized" or "at a time when a predetermined time has passed since the authentication code was generated" or "at a time when it is determined that a valid authentication code is not shared between the receiving-side and originating-side communication devices", or two or more combinations thereof (the same hereinafter).

According to a preferred embodiment of the present invention, the step (3) further comprising: (3-1) generating a new confirmation code at originating-side communication device at each receipt of the authentication code from the receiving-side communication device, and sending the new confirmation code to the receiving-side communication device together with the received authentication code through packets of new communication which is not affected by past communication information; (3-2) determining at the receiving-side communication device that the originating-side communication device is false and terminating the communication when the latest authentication code sent from the receiving-side communication device is not contained in the packets received from the originating-side communication device, while overwriting the received confirmation code on a storage of the receiving-side communication device and sending the overwritten confirmation code and the received authentication code to the originating-side communication device through packets of new communication which is not affected by past communication information when the latest authentication code is contained in the packets received from the originating-side communication device; and (3-3) determining at the originating-side communication device that the receiving-side communication device is false and terminating the communication when the latest authentication code and the latest confirmation code are not contained in the packets received from the receiving-side communication device, while determining that the receiving-side communication device is true when the latest authentication code and the latest confirmation code are contained in the packets received from the receiving-side communication device.

In order to solve the object, the present invention also provides a system for authenticating an originating-side communication device of a group at a receiving-side communication device of the same group on connection from the originating-side communication device to the receiving-side communication device in IP communication, comprising: an IP network; and a plurality of communication devices of the same group connecting to the IP network through communication lines with unique identification numbers, each of the communication devices recording the identification numbers of the other communication devices of the same group, the originating-side communication device being uniquely connected to the receiving-side communication device based on the identification number so as to transmit packets between the originating-side and the receiving-side communication devices, the receiving-side communication device having an authentication code generator generating a new authentication code whenever at least one prescribed condition is met, a first authentication code storage on which the new authentication code is overwritten at each generation of the new authentication code, a first authentication code sending unit embedding the authentication code overwritten on the first authentication code storage in packets to be sent to the originating-side communication device, a first authentication code extraction unit extracting the authentication code from the packets received from the originating-side communication device, and a determination unit determining that the originating-side communication device is true when the authentication code extracted by the first authentication code extraction unit corresponds to the latest authentication code sent from the receiving-side communication device, while determining that the originating-side communication device is false when the extracted authentication code does not correspond to the latest authentication code, the originating-side communication device having, a second authentication code extraction unit extracting the authentication code from the packets which are received from the receiving-side communication device, a second authentication code storage on which the new authentication code is overwritten at each extraction of the new authentication code by the second authentication code extraction unit, and a second authentication code sending unit embedding the authentication code overwritten on the second authentication code storage in packets to be sent to the receiving-side communication device.

Effect of the Invention

According to the present invention, in IP communication, the authentication code uniquely generated by the receiving-side communication device is sent to the originating-side communication device and stored in the originating-side communication device.

Then on connection from the originating-side communication device to the receiving-side communication device, the packets containing the authentication code is sent from the originating-side communication device to the receiving-side communication device, and it is determined at the receiving-side communication device whether the originating-side communication device is true or false depending on if the authentication code sent from the receiving-side communication device is contained in the packets received from the originating-side communication device or not.

Thereby, it is possible to reliably authenticate the originating-side communication device from the receiving-side communication device, and consequently the spoofing of the originating-side communication line is excluded.

Furthermore, there is no need to have a complicated and expensive configuration in the prior art because the authentication code is not generated synchronously on the originating-side and the receiving-side in the same way as a one-time password but uniquely generated by the receiving-side communication device, and accordingly, secure data communication can be realized in a simple and low-cost configuration.

BEST NODE FOR CARRYING OUT THE INVENTION

A preferred embodiment of the present invention will be explained below with reference to accompanying drawings.

Figure 1:
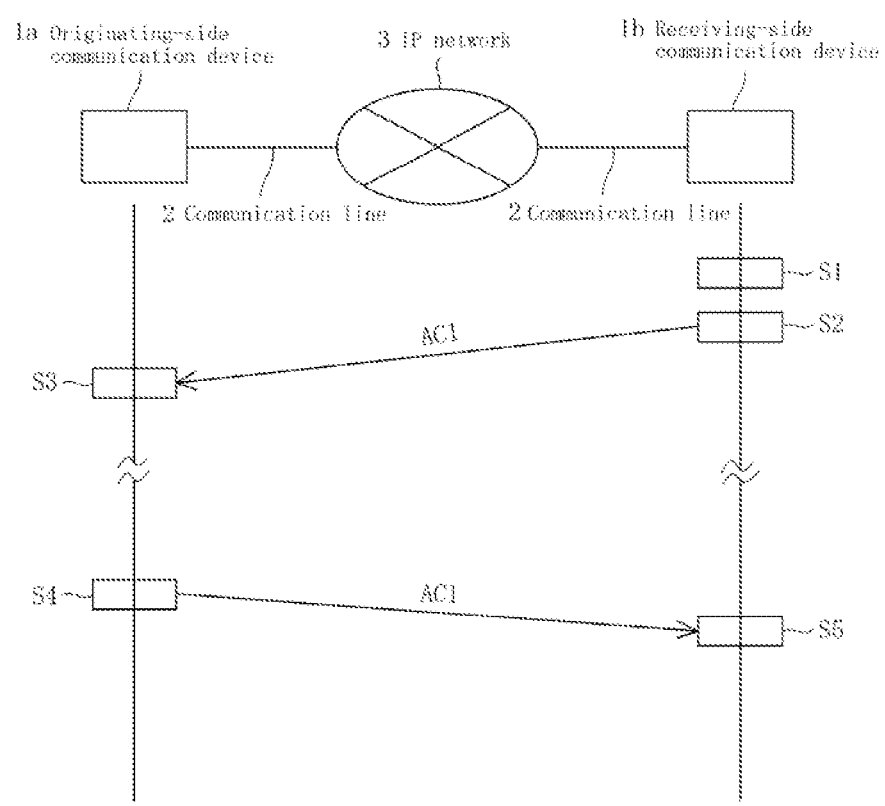
FIG. 1 is a sequence diagram of an authentication method in IP communication according to an embodiment of the present invention.

FIG. 1 is a sequence diagram of an authentication method in IP communication according to an embodiment of the present invention.

Referring to FIG. 1, the authentication method of the present invention assumes an IP network 3 to which a plurality of communication devices 1a, 1b, each of which belongs to the same group, are connected through communication lines 2 to each of which a unique identification number is assigned. Each of the communication devices 1a, 1b, records the identification number of the other communication device 1a, 1b of the same group in advance.

Communication in the IP network 3 (IP communication) is performed by uniquely connecting to a receiving-side communication device 1b from an originating-side communication device 1a based on the identification numbers and transmitting packets between the originating-side and the receiving-side communication devices.

In this case, each of the communication devices 1a, 1b may be a single computer with a function to connect to an IP network, or a router located between a communication line and a private network, that is, LAN to which a plurality of computers are connected. Also, "computer" contains a large server, a PC (Personal Computer), an IoT terminal and so on.

According to the present invention, at the receiving-side communication device 1b, a new authentication code AC1 is generated whenever at least one prescribed condition is met (S1 of FIG. 1).

Here, "authentication code" means an array of numbers and/or signs generated by a method unknown to third parties, and "method unknown to third parties" means an arithmetic processing using numerical values specific to a communication device which generates the authentication code, time information, random numbers and so on.

Then the "authentication code" or "information derived according to a certain method using the authentication code" as a password shared within the same group is used to authenticate the other party.

Also, "when at least one prescribed condition is met" means "at a time when the power of the receiving-side communication device 1b is turned on" or "at a time when the receiving-side communication device 1b is initialized" or "at a time when a predetermined time has passed since the authentication code was sent from the receiving-side communication device 1b to the originating-side communication device 1a" or "at a time when it is determined at the receiving-side communication device 1b that a valid authentication code is not shared between the receiving-side and originating-side communication devices 1a, 1b", or two or more combinations thereof.

Preferably, "the elapsed time after the authentication code was sent from the receiving-side communication device 1b to the originating-side communication device 1a" is adjusted depending on frequency or time interval of generation of information to be transmitted from the originating-side communication device 1a.

According to the present invention, next, the new authentication code AC1 is sent to the originating-side communication device 1a through packets of new communication which is not affected by past communication information whenever the new authentication code AC1 is generated at the receiving-side communication device 1b (S2 of FIG. 1).

In this case, the authentication code AC1 may be contained in each of packets sent from the receiving-side communication device 1b or the authentication codes AC1 may be contained in some packets of a certain communication unit (every session). Thereby communication security can be realized.

Then the authentication code AC1 is overwritten on a storage of the originating-side communication device 1a whenever the authentication code AC1 is received from the receiving-side communication device 1b (S3 of FIG. 1).

Thereafter, packets containing the overwritten authentication code AC1 from the originating-side communication device 1a to the receiving-side communication device 1b on connection from the originating-side communication device 1a to the receiving-side communication device 1b (S4 of FIG. 1).

At the receiving-side communication device 1b, it is determined that the originating-side communication device 1a is true when the latest authentication code AC1 which has been sent from the receiving-side communication device 1b is contained in the packets received by the receiving-side communication device 1b or when information derived according to a certain method using the latest authentication code AC1 is contained in the received packets, while being determined that the originating-side communication device 1a is false when such latest authentication code AC1 and such information are not contained. (S5 of FIG. 1).

At the receiving-side communication device 1b, the packets received from the originating-side communication device 1a are cancelled when it is determined that the originating-side communication device 1a is false.

For example, when the packet received from the originating-side communication device 1a is a SYN packet of three-way handshake, a SYN,ACK packet as a response of the SYN packet is not sent from the receiving-side communication device 1b at all.

According to the present invention, in IP communication, the authentication code uniquely generated by the receiving-side communication device is sent to the originating-side communication device and stored in the originating-side communication device.

Then on connection from the originating-side communication device to the receiving-side communication device, the packets containing the authentication code is sent from the originating-side communication device to the receiving-side communication device, and it is determined at the receiving-side communication device whether the originating-side communication device is true or false depending on if the authentication code sent from the receiving-side communication device is contained in the packets received from the originating-side communication device or not.

Thereby, it is possible to reliably authenticate the originating-side communication device from the receiving-side communication device, and consequently the spoofing of the originating-side communication line is excluded.

Furthermore, there is no need to have a complicated and expensive configuration in the prior art because the authentication code is not generated synchronously on the originating-side and the receiving-side in the same way as a one-time password but uniquely generated by the receiving-side communication device, and accordingly, secure data communication can be realized in a simple and low-cost configuration.

In this embodiment, bidirectional operation can be realized between the communication devices by adding the function of the receiving-side communication device $1b$ to the originating-side communication device and adding the function of the originating-side communication device $1a$ to the receiving-side communication device $1b$.

Figure 2:
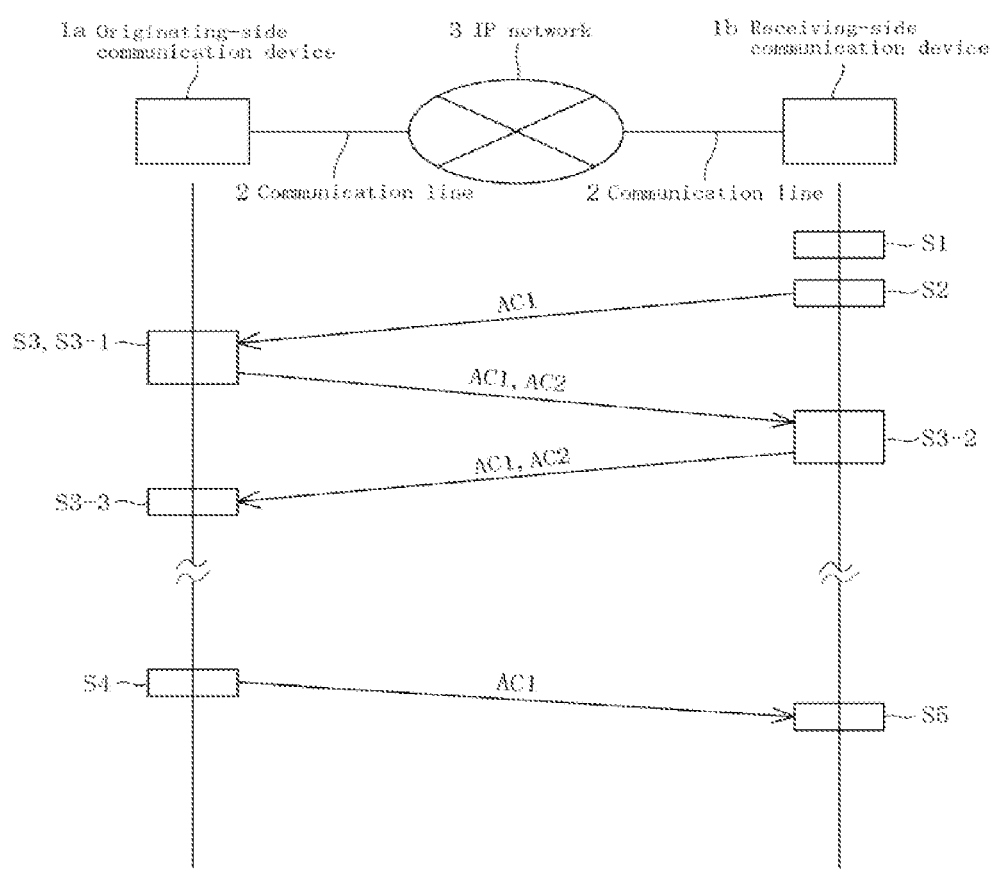
FIG. 2 is a sequence diagram of an authentication method in IP communication according to another embodiment of the present invention.

FIG. 2 is a sequence diagram of an authentication method in IP communication according to another embodiment of the present invention.

According to the embodiment shown in FIG. 2, a step of confirming at the originating-side communication device $1a$ that the receiving-side communication device $1b$ is not fake is added to the configuration of the embodiment shown in FIG. 1.

Therefore, in FIG. 2, the same components as those shown in FIG. 1 are designated by the same reference numerals, and their detailed description is omitted in the following.

According to the embodiment shown in FIG. 2, after the steps S1-S2 are executed in sequence, the authentication code AC1 on a storage of the originating-side communication device $1a$ and a new confirmation code AC2 is generated at originating-side communication device $1a$ at each receipt of the authentication code AC1 from the receiving-side communication device $1b$, and the new confirmation code AC2 is sent to the receiving-side communication device $1b$ together with the received authentication code AC1 through packets of new communication which is not affected by past communication information (S3 and S3-1 of FIG. 2).

Here, "confirmation code" means an array of numbers and/or signs generated by a method unknown to third parties, and "method unknown to third parties" means an arithmetic processing using numerical values specific to a communication device which generates the authentication code, time information, random numbers and so on.

Next, it is determined at the receiving-side communication device $1b$ that the originating-side communication device $1a$ is false and the communication is terminated when the latest authentication code AC1 sent from the receiving-side communication device $1b$ is not contained in the packets received from the originating-side communication device $1a$, while the received confirmation code AC2 is overwritten on a storage of the receiving-side communication device $1b$ and the overwritten confirmation code AC2 and the received authentication code AC1 are sent to the originating-side communication device $1a$ through packets of new communication which is not affected by past communication information when the latest authentication code AC1 is contained in the packets received from the originating-side communication device $1a$ (S3-2 of FIG. 2).

Then it is determined at the originating-side communication device $1a$ that the receiving-side communication device $1b$ is false and the communication is terminated when the latest authentication code AC1 and the latest confirmation code AC2 are not contained in the packets received from the receiving-side communication device $1b$, while it is determined at the originating-side communication device $1a$ that the receiving-side communication device $1b$ is true when the latest authentication code AC1 and the latest confirmation code AC2 are contained in the packets received from the receiving-side communication device $1b$ (S3-3 of FIG. 2).

Thereafter the steps S4-S5 are executed in sequence.

According to this embodiment, the authentication code is sent from the receiving-side communication device to the originating-side communication device, and when the authentication code is stored in the originating-side communication device, the confirmation code uniquely generated by the originating-side communication device is sent to the receiving-side communication device together with the received authentication code. Thereafter it is determined at the originating-side communication device whether the receiving-side communication device is true or false depending on if the authentication code and the confirmation code sent from the originating-side communication device are contained in the packets received from the receiving-side communication device or not. Then only when the receiving-side communication device is confirmed as true, the authentication code is stored in the originating-side communication device and used for subsequent connection to the receiving-side communication device.

Thereby the authentication code is safely sent from the receiving-side communication device to the originating-side communication device, and the authentication code is safely stored in the originating-side communication device.

In this embodiment, bidirectional operation can be realized between the communication devices by adding the function of the receiving-side communication device $1b$ to the originating-side communication device and adding the function of the originating-side communication device $1a$ to the receiving-side communication device $1b$.

According to further embodiment of the present invention, after the step S3 is executed in the embodiment shown in FIG. 1, or after the step S3-3 is executed in the embodiment shown in FIG. 2, the authentication code is shared within the other communication devices of the same group and then the steps S4-S5 are executed in sequence.

Thereby a secure authentication method in IP communication between the communication devices of the same group using the authentication code (password) shared within the same group is proposed in the same manner as in the embodiment shown in FIG. 1 or FIG. 2.

Also, in the embodiment shown in FIG. 1 or FIG. 2, the authentication code may be sent from the receiving-side communication device to a plurality of originating-side communication devices of the same group in advance, and in this case, different authentication codes may be sent to each of the originating-side communication devices or the same authentication code may be sent to each of the originating-side communication devices.

According to further embodiment of the present invention, the same authentication code is sent to a plurality of originating-side communication devices of the same group from a receiving-side communication device or a communication device that only distributes the authentication code in advance, and one of those originating-side communication devices operates as a receiving-side communication device to which another of those originating-side communication devices connects, and it is determined at the communication device operating as the receiving-side communication device whether the originating-side communication device is true or false based on the authentication code, whereby secure data communication can be realized.

Figure 3:
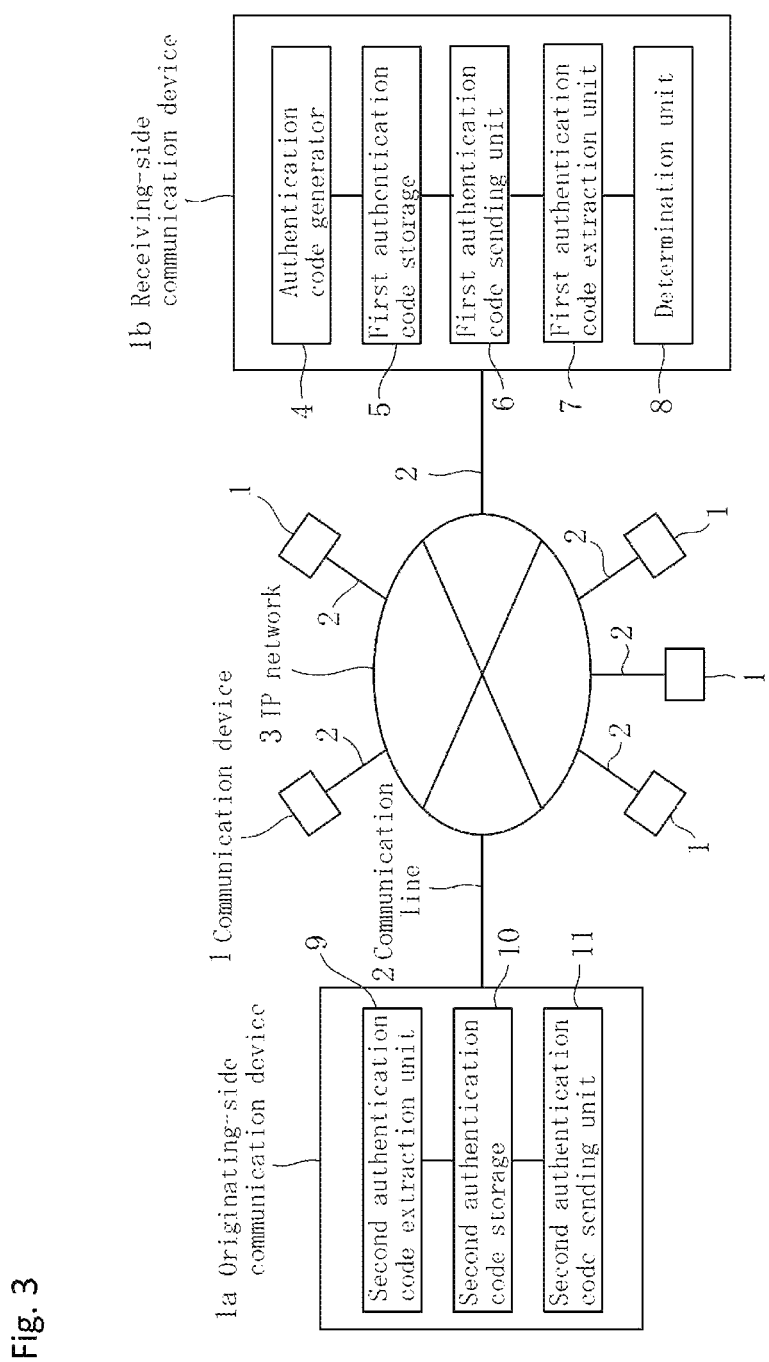
FIG. 3 is a diagram showing a schematic configuration of an authentication system in IP communication according to an embodiment of the present invention.

FIG. 3 is a diagram showing a schematic configuration of an authentication system in IP communication according to an embodiment of the present invention.

Referring to FIG. 3, an authentication system of the present invention comprises an IP network 3 and a plurality of communication devices 1, 1a, 1b of the same group connecting to the IP network 3 through communication lines 2 with unique identification numbers (an IP address, a port number).

Each of the communication devices 1, 1a, 1b records the identification numbers of the other communication devices 1, 1a, 1b of the same group.

Thus the originating-side communication device 1a is uniquely connected to the receiving-side communication device 1b based on the identification number so as to transmit packets between the originating-side and the receiving-side communication devices 1a, 1b (IP communication).

The receiving-side communication device 1b has an authentication code generator 4 generating a new authentication code whenever at least one prescribed condition is met, and a first authentication code storage 5 on which the new authentication code is overwritten at each generation of the new authentication code.

Here, "authentication code" means an array of numbers and/or signs generated by a method unknown to third parties, and "method unknown to third parties" means an arithmetic processing using numerical values specific to a communication device which generates the authentication code, time information, random numbers and so on.

Also, "when at least one prescribed condition is met" means "at a time when the power of the receiving-side communication device 1b is turned on" or "at a time when the receiving-side communication device 1b is initialized" or "at a time when a predetermined time has passed since the authentication code was generated" or "at a time when it is determined that a valid authentication code is not shared between the receiving-side and originating-side communication devices 1a, 1b", or two or more combinations thereof.

The receiving-side communication device 1b further has a first authentication code sending unit 6 embedding the authentication code overwritten on the first authentication code storage 5 in packets to be sent to the originating-side communication device 1a, a first authentication code extraction unit 7 extracting the authentication code from the packets received from the originating-side communication device 1a, and a determination unit 8 determining that the originating-side communication device 1a is true when the authentication code extracted by the first authentication code extraction unit 7 corresponds to the latest authentication code sent from the receiving-side communication device 1b, while determining that the originating-side communication device 1a is false when the extracted authentication code does not correspond to the latest authentication code.

The originating-side communication device 1a has a second authentication code extraction unit 9 extracting the authentication code from the packets which are received from the receiving-side communication device 1b, a second authentication code storage 10 on which the new authentication code is overwritten at each extraction of the new authentication code by the second authentication code extraction unit 9, and a second authentication code sending unit 11 embedding the authentication code overwritten on the second authentication code storage 10 in packets to be sent to the receiving-side communication device 1b.

The same effect as that of the embodiment of FIG. 1 can be obtained by this embodiment as well.

Although the present invention has been explained based on preferred embodiments thereof, the present invention is not limited to the embodiments and one skilled in the art can easily device various modified embodiments within the scope of the claims of the present application.

For example, in FIGS. 2 to 3, secure Internet communication services can be provided by configuring IP network from one or more ISP (Internet Service Provider) networks and implementing the authentication function of the present invention between the originating-side communication device and a communication device of the ISP network accommodating the originating-side communication device or between the receiving-side communication device and a communication device of the ISP network or between the ISP networks.

There is a problem of unauthorized connection due to spoofing in the Internet because a unique is made to a communication line indicated by a destination IP address regardless of the authenticity of a source IP address. Therefore, the Internet is said to be a best-effort type communication network, but has the characteristic of allowing communication without specifying the source, that is, having anonymity.

According to the present invention, it is possible to eliminate connections and communications with fake source IP addresses, and consequently, the Internet and IP network can be operated as a secure communication network close to the telephone exchange network which is a guarantee type communication network allowing only communication with authorized parties by real name.

Thus it is possible to build a kind of VPN (Virtual Private Network) on the Internet by providing the secure communication.

DESCRIPTION OF REFERENCE NUMERALS

1 Communication device
1a originating-side communication device
1b Receiving-side communication device
2 Communication line
3 IP network
4 Authentication code generator
5 First authentication code storage
6 First authentication code sending unit
7 First authentication code extraction unit
8 Determination unit
9 Second authentication code extraction unit
10 Second authentication code storage
11 Second authentication code sending unit

The invention claimed is:

1. A method for authenticating an originating-side communication device of a group at a receiving-side communication device of the same group in Internet Protocol (IP) communication, the IP communication being performed in a manner such that a plurality of communication devices of the same group are connected to an IP network through communication lines with unique identification numbers and that each of the plurality of communication devices records the identification numbers of the other communication devices in advance and that the originating-side communication device is uniquely connected to the receiving-side communication device based on the identification number so as to transmit packets between the originating-side and receiving-side communication devices, comprising:
(1) generating a new authentication code at the receiving-side communication device whenever at least one prescribed condition is met;
(2) sending the new authentication code from the receiving-side communication device to the originating-side communication device through the IP network by means of packets of new communication which is not affected by past communication information at each generation of the new authentication code;
(3) overwriting the authentication code on a storage of the originating-side communication device whenever the authentication code is received from the receiving-side communication device through the IP network;
(4) sending packets containing the overwritten authentication code from the originating-side communication device to the receiving-side communication device through the IP network on connection from the originating-side communication device to the receiving-side communication device through the IP network; and
(5) determining at the receiving-side communication device that the originating-side communication device is true when the packets received by the receiving-side communication device through the IP network contain the latest authentication code which has been sent from the receiving-side communication device through the IP network or information derived according to a certain method using the latest authentication code, while determining at the receiving-side communication device that the originating-side communication device is false when the received packets do not contain such latest authentication code and information.

2. The method according to claim 1, wherein the step (3) further comprising:

(3-1) generating a new confirmation code at originating-side communication device at each receipt of the authentication code from the receiving-side communication device through the IP network, and sending the new confirmation code to the receiving-side communication device through the IP network together with the received authentication code by means of packets of new communication which is not affected by past communication information;
(3-2) determining at the receiving-side communication device that the originating-side communication device is false and terminating the communication when the packets received from the originating-side communication device through the IP network do not contain the latest authentication code sent from the receiving-side communication device through the IP network, while overwriting the received confirmation code on a storage of the receiving-side communication device and sending the overwritten confirmation code and the received authentication code to the originating-side communication device through the IP network by means of packets of new communication which is not affected by past communication information when the received packets contain the latest authentication code; and
(3-3) determining at the originating-side communication device that the receiving-side communication device is false and terminating the communication when the packets received from the receiving-side communication device through the IP network do not contain the latest authentication code and the latest confirmation code, while determining that the receiving-side communication device is true when the received packets contain the latest authentication code and the latest confirmation code.

\* \* \* \* \*